Figure 1:
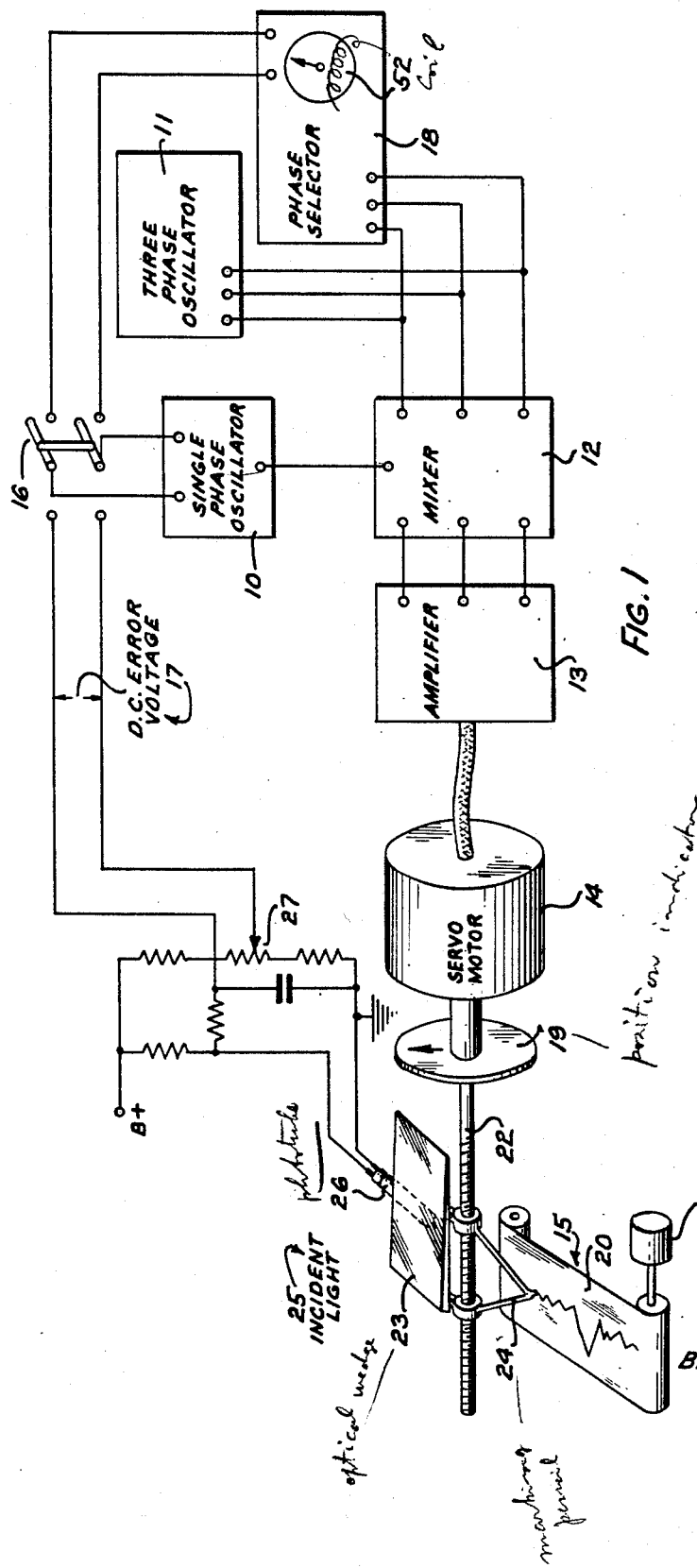

Dec. 23, 1952 D. J. WATSON 2,623,200
SERVO-CONTROL MECHANISM
Filed May 13, 1949 2 SHEETS—SHEET 1

INVENTOR
D. J. WATSON
BY
ATTORNEY

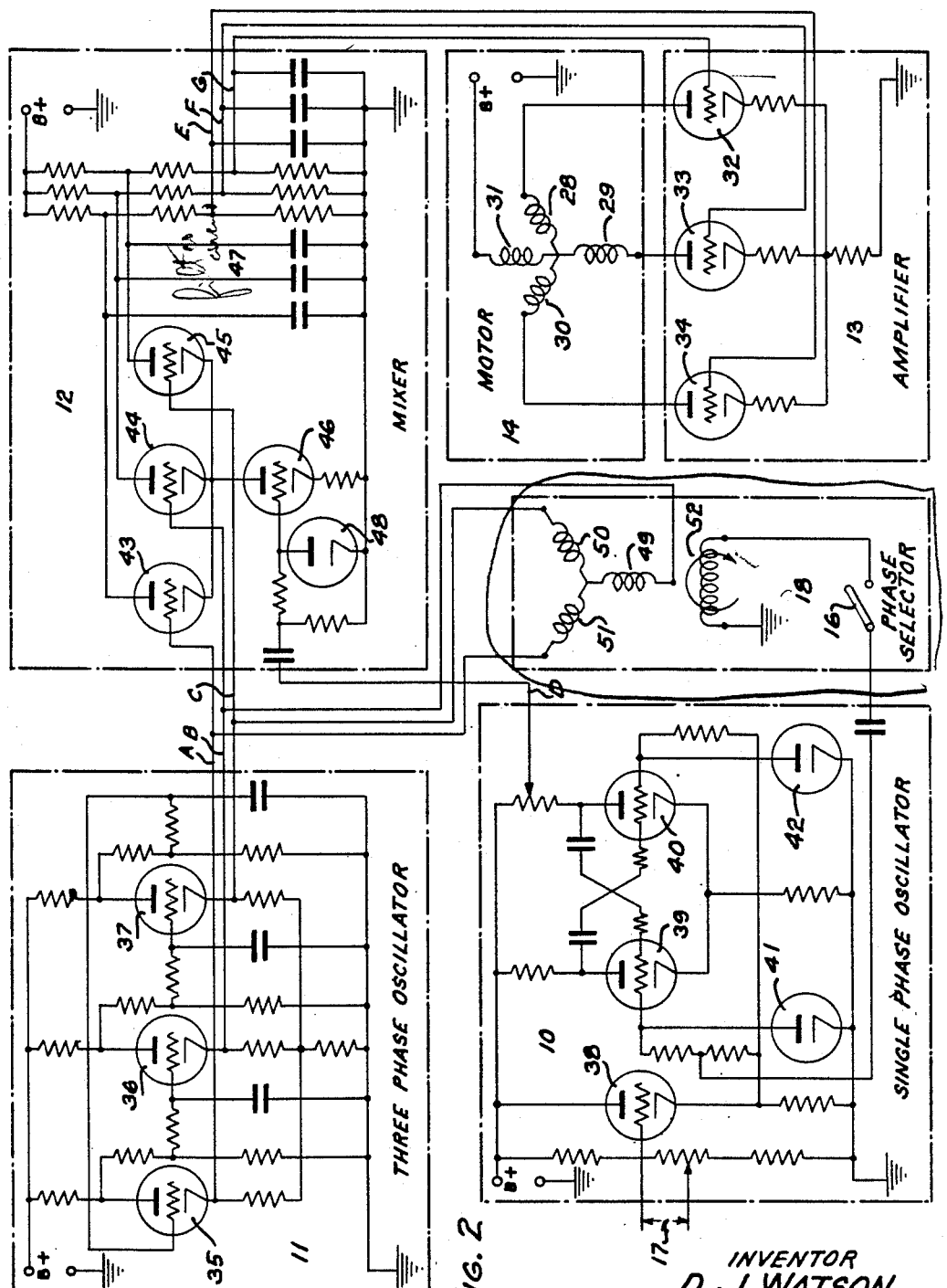

Patented Dec. 23, 1952

2,623,200

UNITED STATES PATENT OFFICE 2,623,200

SERVO-CONTROL MECHANISM

Douglas J. Watson, Saint Lambert, Quebec, Canada, assignor, by mesne assignments, to Northern Electric Company, Limited, Montreal, Quebec, Canada, a corporation of Canada Application May 13, 1949, Serial No. 92,977

9 Claims. (Cl. 318—18)

This invention relates to control mechanisms and more specifically to an electronically-controlled servo-mechanism.

An object of the invention is the provision of a simple, easily controllable servo-mechanism.

Another object of the invention is to provide a servo-control mechanism which allows manual control of the level of speed of a servo-motor which is being continuously controlled in servo-type operation.

Another object of the invention is to provide a servo-mechanism in which the angular position of the motor rotor can be manually controlled.

A further object of the invention is to provide a device which, due to its synchronous feature, exerts approximately the same torque at all times, thus overcoming the frictional difficulties which may be encountered with servo-mechanisms at near balance conditions and preventing the overswing that is experienced when the gain of servo-mechanisms is increased to overcome the effects of friction.

In accordance with one embodiment of the invention, servo-type operation is obtained by deriving a control or error voltage from the appropriate function of the position, speed, etc. of the load being driven by the servo-motor. This control voltage is used to vary the frequency of a single phase oscillator and the output frequency of the single phase oscillator is then mixed with the output of a three phase oscillator. The three frequencies resulting therefrom are amplified and applied directly to the stator winding of a three phase motor to cause the motor load to be driven in such a way as to cancel the error voltage.

The invention further provides means for obtaining position repeater-type operation by synchronizing the single phase oscillator from a phase selector connected to the output of the three phase oscillator, thereby causing the motor rotor to "repeat" the angular position of the phase selector.

A more complete understanding of the invention will be had by referring to the following detailed description when read in conjunction with the accompanying drawings, in which Fig. 1 is a diagrammatic view of one embodiment of the invention, and Fig. 2 is a circuit diagram of the basic components of Fig. 1.

Referring now to Fig. 1, a single phase oscillator 10 and a three phase oscillator 11 have their outputs connected to a mixer 12. The output of the mixer 12 is amplified by an amplifier 13 and the amplified output is applied across the windings of a servo-motor 14 to drive a load, which is indicated generally at 15. The load 15 is driven either as a continuously controlled load or in a position repeater-type operation, depending upon the position of a double pole, double throw switch 16. Continuous control is afforded if switch 16 is in the left-hand closed position, in which case an error voltage 17, which is derived from a function of the load such as position, speed, etc., controls the output of the single phase oscillator 10. If the switch 16 is in the right-hand closed position, angular position repeater-type operation is obtained through the use of a phase selector 18, which is connected between the single phase oscillator 10 and the output of the three phase oscillator 11. The angular position of the rotor of the phase selector 18 is then repeated on the motor rotor, as is indicated by a controlled position indicator 19. It is to be understood that the load indicated generally at 15 can be any type of load which is subject to be driven by a motor. The load is controlled by deriving a function of its speed, position, etc., in the form of a D. C. error voltage 17 and utilizing that voltage to control the output of the single phase oscillator 10.

The particular load indicated at 15 will be described as one example of the operation of the invention. The load in this case consists of a recording device, including a continuous paper supply 20 driven by a clock motor 21. A worm shaft 22 carries and positions an optical wedge 23 and the wedge has associated therewith a marking pencil 24, which continuously records on the paper 20. A source of incident light 25 impinging on the wedge 23 causes a D. C. voltage to be generated by a photo tube 26 placed beneath the wedge 23, the D. C. voltage thus generated being proportional to the intensity of the light 25 and the position of the wedge 23. The voltage generated by the photo tube 26 then appears across variable resistor 27 as the error voltage 17. It is to be noted that variable resistor 27 can be regulated, thereby providing manual means for regulating the voltage level or range of the error voltage. It will be seen, therefore, that the position of the optical wedge will, at all times, be controlled by the amount of light impinging on the photo tube, thereby to give an indication on the continuously moving paper 20 of the intensity of the light. As has been stated before, this application of the servo system is to be taken as merely one example of its operation. Numerous other examples can be readily devised wherein an error voltage can be obtained to control the load in a servo-type operation.

Referring now to Fig. 2, the motor 14 consists of a stator having windings 28, 29 and 30 similar to those of a conventional three phase motor, and an armature 31. The armature 31 is indicated as a D. C. energized wound rotor; however, it is to be understood that a permanent magnet-type rotor can be substituted therefor. Thus, it will be seen that the motor is, in effect, a synchronous three phase motor, the armature 31 aligning itself with the rotating field generated by the stator windings. The stator windings 28, 29 and 30 of the motor 14 are connected directly to the plates of three D. C. energized amplifier tubes 32, 33 and 34, each having an anode, a cathode and a control grid. The outputs of the three amplifier tubes 32, 33 and 34 are controlled by the frequencies of the currents applied across their respective grids. The generation of these control currents will now be described.

The three phase oscillator 11 includes three electronic tubes 35, 36 and 37, each having an anode, a cathode and a control grid. The three tubes are energized by an appropriate source of D. C. potential as shown and the three outputs of the three phase oscillator 11 appear at A, B and C as three alternating voltages in equally spaced-apart phase relationship.

The single phase oscillator 10 includes three electronic tubes 38, 39 and 40, each having an anode, a cathode and a control grid and energized by an appropriate source of D. C. potential as shown. The input or error voltage 17 is applied across the grid circuit of the tube 38, which has its cathode output connected to the grids of the tubes 39 and 40. The tubes 39 and 40 are connected as a conventional multi-vibrator and have two diodes 41 and 42 connected between their grids and ground in order to control the voltage level to the grids. The output of the single phase oscillator 10 then appears at D.

The mixer 12 includes four electronic tubes 43, 44, 45 and 46, each having an anode, a cathode, and a control grid and being energized by a suitable source of D. C. potential as shown. Outputs A, B and C from the three phase oscillator 11 are connected to the control grids of the tubes 43, 44 and 45, respectively, and output D from the single phase oscillator 10 is connected to the control grid of tube 46. The plate of tube 46 is connected to the cathodes of tubes 43, 44 and 45 and the cathode of tube 46 is connected to ground; thus it is obvious that the outputs of tubes 43, 44 and 45 are dependent upon the input D to the grid of tube 46 as well as the inputs A, B and C to tubes 43, 44 and 45. A diode 48 is connected between the input D to the grid of tube 46 and ground in order to control the voltage level of the input to the grid of the tube 46. The outputs of the mixer then appear at E, F and G and are applied across the grids of amplifier tubes 32, 33 and 34 to control the current to the motor windings 28, 29 and 30. A filter circuit is indicated generally at 47, the function of which will be clear from the mathematical derivation of the output frequencies which is given below. The filter circuit 47 consists of various conventional resistance-capacitance combinations, the values of which are dependent upon the frequencies being used, and each pair of frequency outputs from the mixer is passed through its respective resistance-capacitance circuit to filter one of the frequencies out for reasons that will appear in the following mathematical derivation of the frequencies used in the invention.

The frequencies A, B, C, D, E, F and G are derived as follows:

If $\sin \omega_1 t$ = voltage at output A then $\sin (\omega_1 t + 2/3\pi)$ = voltage at output B and $\sin (\omega_1 t + 4/3\pi)$ = voltage at output C Further, assuming $\sin \omega_2 t$ = voltage at output D, then output $E = K \sin \omega_1 t \times \sin \omega_2 t$
$= K/2 [\cos(\omega_1 - \omega_2) t - \cos(\omega_1 + \omega_2) t]$ output $F = K \sin(\omega_1 t + 2/3\pi) \times \sin \omega_2 t$
$= K/2 [\cos\{(\omega_1 - \omega_2) t + 2/3\pi\} - \cos\{(\omega_1 + \omega_2) t + 2/3\pi\}]$ output $G = K \sin (\omega_1 t + 4/3\pi) \times \sin \omega_2 t$
$= K/2 [\cos\{(\omega_1 - \omega_2) t + 4/3\pi\} - \cos\{(\omega_1 + \omega_2) t + 4/3\pi\}]$.

By use of a proper filter 47, the frequency $(\omega_1 + \omega_2)$ is filtered out; then, letting $(\omega_1 - \omega_2) = \omega_0$, we get:

At $\omega_0 > 0$, output $E = K/2 \cos \omega_0 t$ output $F = K/2 \cos (\omega_0 t + 2/3\pi)$ output $G = K/2 \cos(\omega_0 t + 4/3\pi)$ and at $\omega_0 < 0$, output $E = K/2 \cos \omega_0 t$ output $F = K/2 \cos (\omega_0 t - 2/3\pi)$ output $G = K/2 \cos (\omega_0 t - 4/3\pi)$ At $\omega_0 = 0$, a D. C. voltage only is present at the mixer output; thus no correction voltage is applied to the motor and the load is at its proper position, speed or other optimum condition and no error voltage is being derived.

The frequency $\omega_1$ of the three phase oscillator is selected to give the sensitivity desired, which sensitivity increases with increasing $\omega_1$. The frequency $\omega_2$ of the single phase oscillator is controlled by the error voltage mentioned above, over a range preferably with $\omega_1$ as its center frequency.

The phase selector 18 is shown in Fig. 2 as a goniometer having stator windings 49, 50 and 51, each connected to one of the outputs of the three phase oscillator 11. A movable coil 52 of the goniometer has one side connected to ground and the other side connected through the switch 16 to the grid circuits of the tubes 39 and 40 in the single phase oscillator 10. Since the load 15 shown in Fig. 1 is merely illustrative, no load has been shown in Fig. 2 in the interest of simplicity and clarity. It is to be understood, however, that the rotor 31 (Fig. 2) is connected either to a load or to a position indicator, or to both, as shown in Fig. 1, and a control or error voltage 17 is derived from the load to control the oscillator 10 when servo operation is desired. For this reason, switch 16 (Fig. 2) is only one-half of the actual switch 16 shown in Fig. 1 and it is obvious that any appropriate type of switch or switches could be employed in place of the switch 16.

It is to be further understood that the phase selector 18 could be in numerous other forms than that disclosed, such, for example, as a potentiometer or a capacitor.

In the operation of the device, assuming that servo operation is desired, the switch 16 (Fig. 1) is moved to the left-hand closed position. Assuming further that a load is being driven by the servo-motor and that means is provided for deriving a D. C. error voltage 17 proportional to a variation of the load from normal operating conditions, the error voltage 17 is applied to the grid 38 of the single phase oscillator 10. Thus the frequency output of the single phase oscillator 10 is directly controlled by the error voltage 17 and the output of the single phase oscillator 10 appears at D. The three constant frequency outputs of the three phase oscillator 11 appearing at A, B and C are thus modified by the frequency output D in the mixer 12 and filter 47 to produce output E, F and G. The outputs E, F and G of the mixer 12 are then applied across the grids of the three tubes of the amplifier 13 in such a manner as to cause the plate currents of the three electronic tubes 32, 33 and 34 of the amplifier 13 to be applied across the stator windings of the motor 14 to cause its rotor 31 to correct the conditions in the load and reduce the error voltage 17 to zero.

In the operation of the device as a position repeater, the switch 16 (Fig. 1) is moved to the right-hand closed position. Assuming that it is desired to have the motor load assume a certain angular position, which position is to be indicated on the controlled position indicator 19, the movable coil 52 of the phase selector 18 is rotated to a desired angular position. This operation results in synchronization of the single phase oscillator with the three phase oscillator, thus causing the angular position of the rotor 52 of the phase selector to be repeated on the rotor 31 of the motor 14.

It is to be noted that it is desirable that the three stator windings of the motor 14 be directly operated by the plate currents of the three phase amplifier 13. For this reason, it is desirable that each stator winding have three sections—one of $n$ turns in series with the plate of one amplifier tube and two of $n/2$ turns, one each in series (but in opposite polarity to the winding of $n$ turns) with the other two tubes. This effects a cancellation of the flux produced by the D. C. component of the amplifier plate currents.

It is to be further noted that the permissible rate of change of the error voltage is limited by the combined inertia of the rotor and the motor load. If this rate is too low for the fluctuations encountered, a simple integrating circuit of the appropriate time constant may be inserted in the error voltage input circuit to the single phase oscillator. Neither the integrating circuit nor the method of winding the servo-motor stators comprises any portion of the present invention and, therefore, it is not considered necessary that they be disclosed or described in detail.

It is obvious that any of the electronic tubes described herein as having an anode, a cathode, and a control grid may be replaced by any suitable thermionic valve having other electrodes in addition to those of the tubes described herein by the application of fundamental electronics circuit theory. It is further obvious that the filter circuit 47 could be designed to use other elements or combinations than the resistance-capacitance combinations shown without departing from the scope of the invention.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In apparatus for controlling the position of an element, a three phase motor having three stator windings and a rotor, means linking said rotor to drive said element, a single phase oscillator, a three phase oscillator, a phase selector having three stationary elements and a movable element, means connecting the respective outputs of the three phase oscillator to the respective stationary elements of said phase selector, means connecting said movable element to the input of said single phase oscillator, means for mixing the output of the single phase oscillator with the outputs of the three phase oscillator, and means for applying the respective outputs of the mixer across the respective stator windings of the three phase motor, thereby to angularly position said motor rotor in accordance with the angular position of the movable element of said phase selector.

2. In a servo system wherein a function of a load provides an error voltage, the combination with a three phase motor connected to drive said load of a first, a second and a third thermionic valve, said first thermionic valve having its grid connected to said error voltage and its cathode connected to the grids of said second and third thermionic valves, said second thermionic valve having its grid connected through a condenser to the plate of said third thermionic valve and said third thermionic valve having its grid connected through a condenser to the plate of said second thermionic valve to cause said second and third valves to function as a multi-vibrator, a fourth, a fifth and a sixth thermionic valve, said fourth thermionic valve having its plate connected to the grid of said fifth thermionic valve, said fifth thermionic valve having its plate connected to the grid of said sixth thermionic valve, and said sixth thermionic valve having its plate connected to the grid of said fourth thermionic valve to cause said fourth, fifth and sixth thermionic valves to function as a three phase oscillator, a seventh, an eighth, a ninth and a tenth thermionic valve, said seventh thermionic valve having its plate-cathode circuit in series with the plate-cathode circuits of said eighth, ninth and tenth thermionic valves and its grid connected to the output of said multi-vibrator, said eighth, ninth and tenth thermionic valves having their respective grids connected to the respective outputs of said three phase oscillator, thereby to cause each of said eighth, ninth and tenth valves to produce sum and difference frequencies in each of their output circuits, means including resistance-capacitance combinations for filtering out the sum frequency in each of the output circuits, and means including three thermionic amplifier tubes for impressing the three difference frequencies across the respective windings of said motor, thereby to cause said motor to drive the load to reduce said error voltage to zero.

3. In a servo system wherein a function of a load provides an error voltage, the combination with a three phase motor connected to drive said load of a first, a second and a third thermionic valve, said first thermionic valve having its grid connected to said error voltage and its cathode connected to the grids of said second and third thermionic valves, said second thermionic valve having its grid connected through a condenser to the plate of said third thermionic valve and said third thermionic valve having its grid connected through a condenser to the plate of said second thermionic valve to cause said second and third valves to function as a multi-vibrator, a fourth, a fifth and a sixth thermionic valve, said fourth thermionic valve having its plate connected to the grid of said fifth thermionic valve, said fifth thermionic valve having its plate connected to the grid of said sixth thermionic valve, and said sixth thermionic valve having its plate connected to the grid of said fourth thermionic valve to cause said fourth, fifth and sixth thermionic valves to function as a three phase oscillator, a seventh, an eighth, a ninth and a tenth thermionic valve, said seventh thermionic valve having its plate-cathode circuit in series with the plate-cathode circuits of said eighth, ninth and tenth thermionic valves and its grid connected to the output of said multi-vibrator, said eighth, ninth and tenth thermionic valves having their respective grids connected to the respective outputs of said three phase oscillator, thereby to cause each of said eighth, ninth and tenth valves to produce sum and difference frequencies in each of their output circuits, means for filtering out the sum frequency in each of the output circuits, and means for impressing the three difference frequencies across the respective windings of said motor, thereby to cause said motor to drive the load to reduce said error voltage to zero.

4. In a servo system wherein a function of a load provides an error voltage, the combination with a three phase motor connected to drive said load of a first, a second and a third thermionic valve, said first thermionic valve having its grid connected to said error voltage and its cathode connected to the grids of said second and third thermionic valves, said second thermionic valve having its grid connected through a condenser to the plate of said third thermionic valve and said third thermionic valve having its grid connected through a condenser to the plate of said second thermionic valve to cause said second and third valves to function as a multi-vibrator, a fourth, a fifth and a sixth thermionic valve, said fourth thermionic valve having its plate connected to the grid of said fifth thermionic valve, said fifth thermionic valve having its plate connected to the grid of said sixth thermionic valve, and said sixth thermionic valve having its plate connected to the grid of said fourth thermionic valve to cause said fourth, fifth and sixth thermionic valves to function as a three phase oscillator, means for modifying the outputs of said three phase oscillator in proportion to the output of said multi-vibrator, and means for impressing the resulting modified frequencies across the respective windings of said motor, thereby to cause said motor to drive the load to reduce said error voltage to zero.

5. In a servo system wherein a function of a load provides an error voltage, the combination with a three phase motor connected to drive said load of a first, a second and a third thermionic valve, said first thermionic valve having its grid connected to said error voltage and its cathode connected to the grids of said second and third thermionic valves, said second thermionic valve having its grid connected through a condenser to the plate of said third thermionic valve and said third thermionic valve having its grid connected through a condenser to the plate of said second thermionic valve to cause said second and third valves to function as a multi-vibrator, a fourth, a fifth and a sixth thermionic valve, said fourth thermionic valve having its plate connected to the grid of said fifth thermionic valve, said fifth thermionic valve having its plate connected to the grid of said sixth thermionic valve, and said sixth thermionic valve having its plate connected to the grid of said fourth thermionic valve to cause said fourth, fifth and sixth thermionic valves to function as a three phase oscillator, means for modifying the outputs of said three phase oscillator in proportion to the output of said multi-vibrator, means for filtering out a portion of said modified frequencies, and means including an amplifier for impressing the remainder of said modified frequencies across the respective windings of said motor, thereby to cause said motor to drive the load to reduce said error voltage to zero.

6. In a servo system wherein a function of a load provides an error voltage, the combination with a three phase motor connected to drive said load of a first, a second and a third thermionic valve, said first thermionic valve having its grid connected to said error voltage and its cathode connected to the grids of said second and third thermionic valves, said second thermionic valve having its grid connected through a condenser to the plate of said third thermionic valve and said third thermionic valve having its grid connected through a condenser to the plate of said second thermionic valve to cause said second and third valves to function as a multi-vibrator, means for generating a three phase alternating current, means for modifying said three phase alternating current in proportion to the output of said multi-vibrator, and means for impressing said modified output across the respective windings of said motor, thereby to cause said motor to drive the load to reduce the error voltage to zero.

7. In a servo system wherein a function of a load provides an error voltage, the combination with a three phase motor connected to drive said load of a first, a second and a third thermionic valve, said first thermionic valve having its grid connected to said error voltage and its cathode connected to the grids of said second and third thermionic valves, said second thermionic valve having its grid connected through a condenser to the plate of said third thermionic valve and said third thermionic valve having its grid connected through a condenser to the plate of said second thermionic valve to cause said second and third valves to function as a multi-vibrator, a three phase oscillator comprising a fourth, a fifth and a sixth thermionic valve, a seventh, an eighth, a ninth and a tenth thermionic valve, said seventh thermionic valve having its plate-cathode circuit in series with the plate-cathode circuits of said eighth, ninth and tenth thermionic valves and its grid connected to the output of said multi-vibrator, said eighth, ninth and tenth thermionic valves having their respective grids connected to the respective outputs of said three phase oscillator, thereby to cause each of said eighth, ninth and tenth valves to produce sum and difference frequencies in each of their output circuits, means including resistance-capacitance combinations for filtering out the sum frequency in each of the output circuits, and means including three thermionic amplifier tubes for impressing the three difference frequencies across the respective windings of said motor, thereby to cause said motor to drive the load to reduce said error voltage to zero.

8. In a servo system wherein a function of a load provides an error voltage, the combination with a three phase motor connected to drive said load of means including a first, a second and a third thermionic valve for producing a single frequency alternating current proportional to the magnitude and direction of said error voltage, a fourth, a fifth and a sixth thermionic valve, said fourth thermionic valve having its plate connected to the grid of said fifth thermionic valve, said fifth thermionic valve having its plate connected to the grid of said sixth thermionic valve, and said sixth thermionic valve having its plate connected to the grid of said fourth thermionic valve to cause said fourth, fifth and sixth thermionic valves to function as a three phase oscillator, a seventh, an eighth, a ninth and a tenth thermionic valve, said seventh thermionic valve having its plate-cathode circuit in series with the plate-cathode circuits of said eighth, ninth and tenth thermionic valves and its grid connected to the output of said first-named means, said eighth, ninth and tenth thermionic valves having their respective grids connected to the respective outputs of said three phase oscillator, thereby to cause each of said eighth, ninth and tenth valves to produce sum and difference frequencies in each of their output circuits, means including resistance-capacitance combinations for filtering out the sum frequency in each of the output circuits, and means including three thermionic amplifier tubes for impressing the three difference frequencies across the respective windings of said motor, thereby to cause said motor to drive the load to reduce said error voltage to zero.

9. In a servo system wherein a function of a load provides an error voltage, the combination with a three phase motor connected to drive said load of means including a first, a second and a third thermionic valve for generating a single frequency alternating current proportional to the magnitude and direction of said error voltage, means including a fourth, a fifth and a sixth thermionic valve for generating a three phase alternating current, a seventh, an eighth, a ninth and a tenth thermionic valve, said seventh thermionic valve having its plate-cathode circuit in series with the plate-cathode circuits of said eighth, ninth and tenth thermionic valves and its grid connected to the output of said single frequency alternating current generating means, said eighth, ninth and tenth thermionic valves having their respective grids connected to the respective outputs of said three phase alternating current generating means, thereby to cause each of said eighth, ninth and tenth valves to produce sum and difference frequencies in each of their output circuits, means including resistance-capacitance combinations for filtering out the sum frequency in each of the output circuits, and means including three thermionic amplifier tubes for impressing the three difference frequencies across the respective windings of said motor, thereby to cause said motor to drive the load to reduce said error voltage to zero.

DOUGLAS J. WATSON.

REFERENCES CITED

The following references are of record in the file of this patent:

UNITED STATES PATENTS

| Number | Name | Date |
| --- | --- | --- |
| 2,058,114 | Usselman | Oct. 20, 1936 |
| 2,303,654 | Newton | Dec. 1, 1942 |
| 2,385,641 | Peterson | Sept. 25, 1945 |
| 2,404,832 | Koch | July 30, 1946 |
| 2,446,607 | Peterson | Aug. 10, 1948 |
| 2,479,817 | Curran | Aug. 23, 1949 |